United States Patent [19]

Franco

[11] Patent Number: 4,538,660
[45] Date of Patent: Sep. 3, 1985

[54] ROTARY DRIVE DEVICE FOR MANDREL-CARRYING ARBORS OF TIRE DISMOUNTING MACHINES

[75] Inventor: Boccaletti Franco, Modena, Italy
[73] Assignee: F.A.I.P. S.p.A., Modena, Italy
[21] Appl. No.: 524,509
[22] Filed: Aug. 18, 1983
[30] Foreign Application Priority Data Sep. 6, 1982 [IT] Italy .............................. 29043/82[U]

[51] Int. Cl.³ .............................................. B60C 25/00
[52] U.S. Cl. ................................................... 157/20
[58] Field of Search ................................... 157/1.24, 20

[56] References Cited

U.S. PATENT DOCUMENTS 3,807,477  4/1974  Curtis ........................... 157/1.24 X
3,847,198  11/1974  Brosene ........................... 157/1.24
4,031,941  6/1977  Malinski et al. ............... 157/1.24 X Primary Examiner—James G. Smith
Attorney, Agent, or Firm—Body, Vickers & Daniels

[57] ABSTRACT

A drive arrangement is disclosed for rotating the rim and tire supporting mandrel of a tire dismounting machine. The drive arrangement includes a hydraulic cylinder reciprocable relative to a piston rod fixed in the machine housing. The cylinder carries a rack engaging a pinion on an arbor which supports the mandrel, whereby reciprocation of the cylinder in opposite directions relative to the piston rod rotates the mandrel and thus a rim and tire thereon in opposite directions, each of which directions provide for one revolution of the mandrel in the corresponding direction.

1 Claim, 1 Drawing Figure

U.S. Patent  Sep. 3, 1985  4,538,660
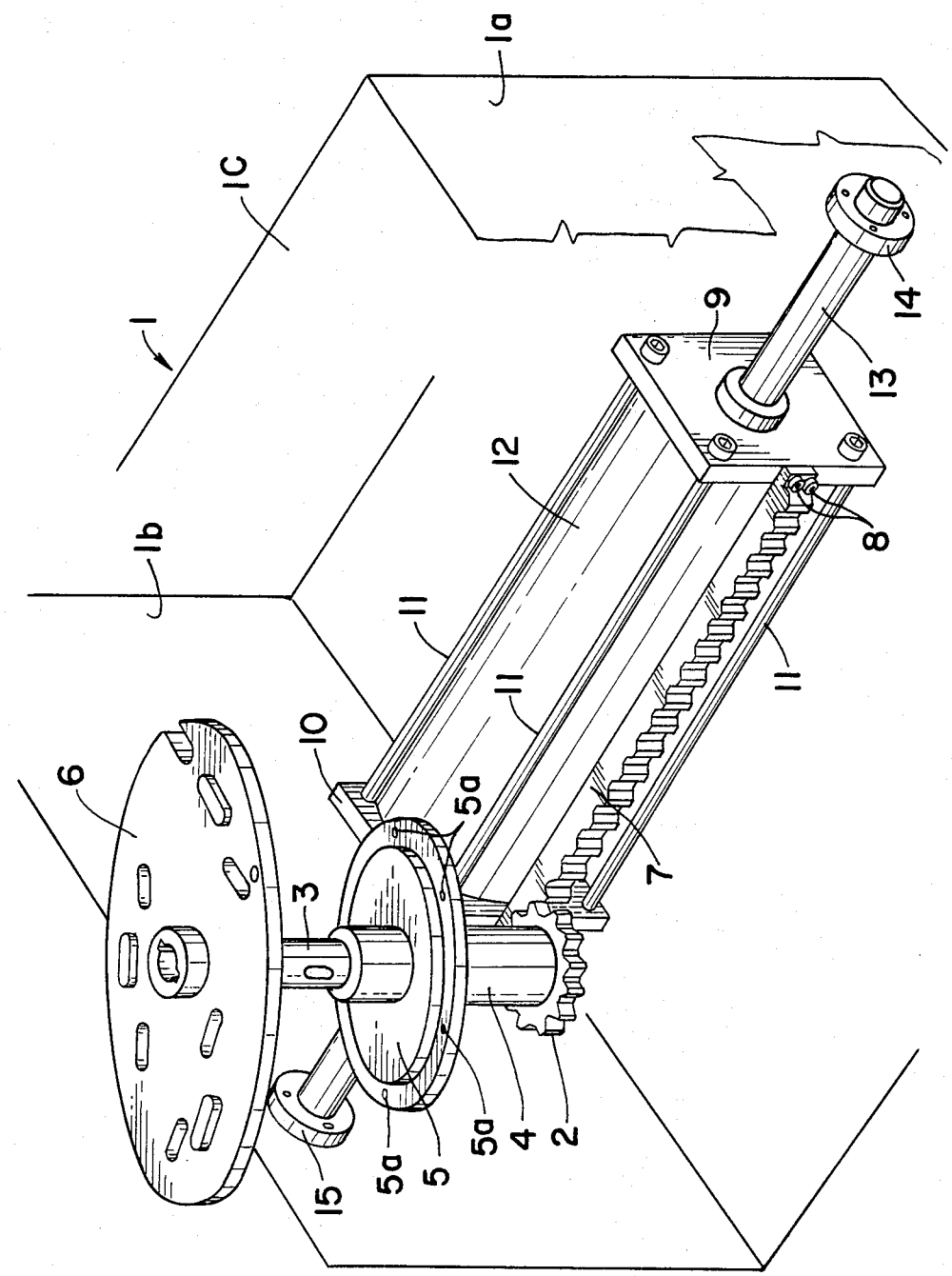

ROTARY DRIVE DEVICE FOR MANDREL-CARRYING ARBORS OF TIRE DISMOUNTING MACHINES

BACKGROUND OF THE INVENTION

The present invention concerns a device for providing rotational drive to mandrel-carrying arbors of tire dismounting machines.

Devices for rotating the mandrels which lock to the rims of automobile wheels on tire dismounting machines are known, powered predominantly by electric motors. However, such known devices present some disadvantages which include the requirement for couplings of reducing gears to be placed between the motor, which presents a rather high number of revolutions, and the mandrel itself, which, for operational reasons, must revolve at a very low velocity. A further disadvantage is the fact that the motor driving such mandrels is electrical and thus subject, in environments characterized by high atmospheric humidity or direct exposure to corrosive agents, to dangerous oxidation of internal and external contacts and to other damages which notably reduce their life expectancy. Moreover, not the least disadvantageous aspect of such known devices is the high cost which derives from the use of numerous reduction gears, and of the electric motors themselves.

SUMMARY OF THE INVENTION

The above mentioned disadvantages are avoided in accordance with the present invention by providing a rotatory drive device for arbors carrying mandrels on tire dismounting machines which makes it possible to obtain the rotation of the arbors, and consequently of the mandrels keyed to them, the rotation being extremely slow, without the necessity of recourse to the use of reduction gears. Moreover, a rotatory drive device according to the invention can be installed in environments with damaging atmospheric characteristics and, in the final analysis, is relatively economical both as to its production and its maintenance.

More particularly in accordance with the present invention, a device providing rotational drive to arbors carrying mandrels on tire dismounting machines is characterized by the fact that it comprises a box-like container housing for a drivable rack supported for alternate horizontal movement, and which rack engages a pinion that is likewise horizontal and keyed to the arbor. The mandrel is also keyed to the arbor and projects above the box-like structure.

It is accordingly an outstanding object of the present invention to provide an improved rotatory drive arrangement for the arbor and mandrel of a tire dismounting machine.

Another object is to provide a drive arrangement of the foregoing character which avoids the use of speed reducing gear arrangements between the drive motor and the arbor and mandrel.

Still another object is to provide a drive arrangement of the foregoing character which can be installed and used in environments having undesirable atmospheric or other conditions with minimum jeopardy to operation of the device and life of the component parts thereof as a result of such conditions.

A further object is to provide a tire dismounting machine in which a rack and pinion drive for the supporting mandrel is disposed within a housing and supported for driving movement therein, whereby only the mandrel and a portion of the arbor on which the mandrel is mounted are exposed outside the housing.

BRIEF DESCRIPTION OF THE DRAWING

Additional characteristics and advantages will be seen more fully from the detailed description hereafter of a preferred embodiment of the invention, illustrated in the attached drawing, in which the single FIG. 1 represents a view in perspective of a rotatory drive device for a tire dismounting machine according to the invention.

DESCRIPTION OF THE PREFERRED EMBODIMENT

Referring now in detail to the drawing, the numeral 1 represents a box-like housing which, as partially and schmatically shown, includes end walls 1a and 1b, side walls 1c only one of which is shown, a bottom not designated numerically, and a top wall, not shown, which extends across the upper edges of the end and side walls. Container or housing 1 encloses and supports the rotatory drive arrangement for the mandrel of the tire dismounting machine, and which drive arrangement comprises a pinion 2 keyed coaxially to a shaft or arbor 3 capable of rotating inside a sleeve 4 integral with a mounting flange 5 which is bolted to the top wall of the enclosure 1. While not shown in detail in the drawing, it will be understood that flange 5 is bolted to the top wall by bolts extending through holes 5a in the flange and corresponding holes in the top wall. Arbor 3 carries at its upper extremity a mandrel 6 which is adapted to support the rim of a tire to be dismounted. The pinion 2 is engaged by a horizontal rack 7 which is attached, by means of screws or the like 8, to the edges of cylinder flanges 9 and 10. Flanges 9 and 10 are tied together by stay rods 11 and support a cylinder 12, likewise horizontal, which is actuated hydraulically.

The cylinder 12 is supported and guided for reciprocating movements on a shaft 13 which is integral with a piston inside the cylinder itself, not visible in the FIGURE, and the shaft 13 has its extremities 14 and 15 affixed to opposite walls 1a and 1b of the housing 1. It will be appreciated that the opposite ends of cylinder 12 are connected to a suitable source of hydraulic fluid, not shown, so as to provide for the cylinder 12, when hydraulically operated, to be guided along its horizontal movement on the shaft 13, alternately forward and backward. Therefore, the rack 7, integral with the flanges 9 and 10 and supporting the cylinder itself, executes an equal movement. The rack 7, in turn, causes the pinion 2, and consequently the arbor 3 to which it is keyed, and which carries the mandrel 6, to rotate, and thus makes the mandrel rotatory together with the rim and tire supported thereon.

It should be noted that the relationship between the number of teeth on the rack and the pinion is such as to enable the mandrel to execute one complete turn in one direction for each traverse in one direction by the cylinder 12, and consequently a complete turn in the opposite direction for each traverse in the opposite direction of the cylinder. It has been confirmed in practice how the invention thus described attains the present objectives.

The invention thus envisaged is susceptible of numerous modifications and variations, all entering within the scope of the inventive concept. Moreover, all the details are substitutable by other elements which are technically equivalent, and in particular the rack 7 can be actuated by whatever means for causing it to traverse horizontally so as to engage the pinion 2. In practice, the materials employed, as well as the dimensions, may be any which accord with the requirements, without thereby going outside the scope of protection of the following claims.

Having thus described the invention, it is claimed:

1. In a tire dismounting machine including a housing, a rotatable mandrel outside said housing to support the rim of a tire to be dismounted, said housing including a pair of horizontally spaced apart vertical end walls, arbor means for rotating said mandrel, means supporting said arbor means on said housing for rotation relative thereto about a vertical axis between said end walls, pinion means on said arbor means, rack means horizontally reciprocable in the direction between said end walls and drivingly engaging said pinion means, and hydraulic piston and cylinder means to reciprocate said rack means relative to said pinion means, the improvement comprising: said piston and cylinder means including a cylinder member laterally outwardly of said arbor means and having opposite ends in the direction between said end walls, said opposite ends of said cylinder member being on opposite sides of said vertical axis with respect to said direction, said piston and cylinder means further including a piston rod reciprocably supporting said cylinder member and having longitudinally opposite ends each spaced outwardly from a corresponding one of the opposite ends of said cylinder member and fixedly secured to a corresponding one of said end walls of said housing, and said rack means having opposite ends fixedly secured to said opposite ends of said cylinder member for displacement of said cylinder member in opposite directions along said piston rod to displace said rack means therewith to rotate said pinion means.

* * * * *